United States Patent [19]
Kelley

[11] Patent Number: 5,690,528
[45] Date of Patent: Nov. 25, 1997

[54] RELEASE LINER AND METHOD OF USING SAME

[75] Inventor: T. Doyle Kelley, Greenville, S.C.

[73] Assignee: JPS Automotive Products Corporation, Greenville, S.C.

[21] Appl. No.: 656,661

[22] Filed: May 31, 1996

[51] Int. Cl.$^6$ ........................................... B32B 7/00
[52] U.S. Cl. ........................................... 442/260; 442/293
[58] Field of Search ........................... 442/246, 260, 442/261, 293; 428/910

[56] References Cited

U.S. PATENT DOCUMENTS

| | | |
|---|---|---|
| 2,633,440 | 3/1953 | Scholl . |
| 3,152,921 | 10/1964 | Gallagher et al. . |
| 4,017,654 | 4/1977 | Evans et al. . |
| 4,091,135 | 5/1978 | Tajima et al. . |
| 4,761,320 | 8/1988 | Coburn, Jr. . |

OTHER PUBLICATIONS

Manufacturing Specification for a release liner fabric by JPS Automotive L. P. (1 page), Sep. 22, 1995.

*Primary Examiner*—James J. Bell
*Attorney, Agent, or Firm*—Dority & Manning, P.A.

[57] ABSTRACT

The present invention is generally directed to a release liner adapted to separate adjacent layers of an elastomeric material. The release liner, which can be a woven fabric, is made, at least in part, from a fibrillated yarn. The fibrillated yarn provides a more textured surface to the release liner than a multifilament yarn of the same material, which allows the release liner to be easily separable from the elastomeric material. The release liner made according to the present invention is durable and can be used repeatedly before being replaced.

23 Claims, 3 Drawing Sheets

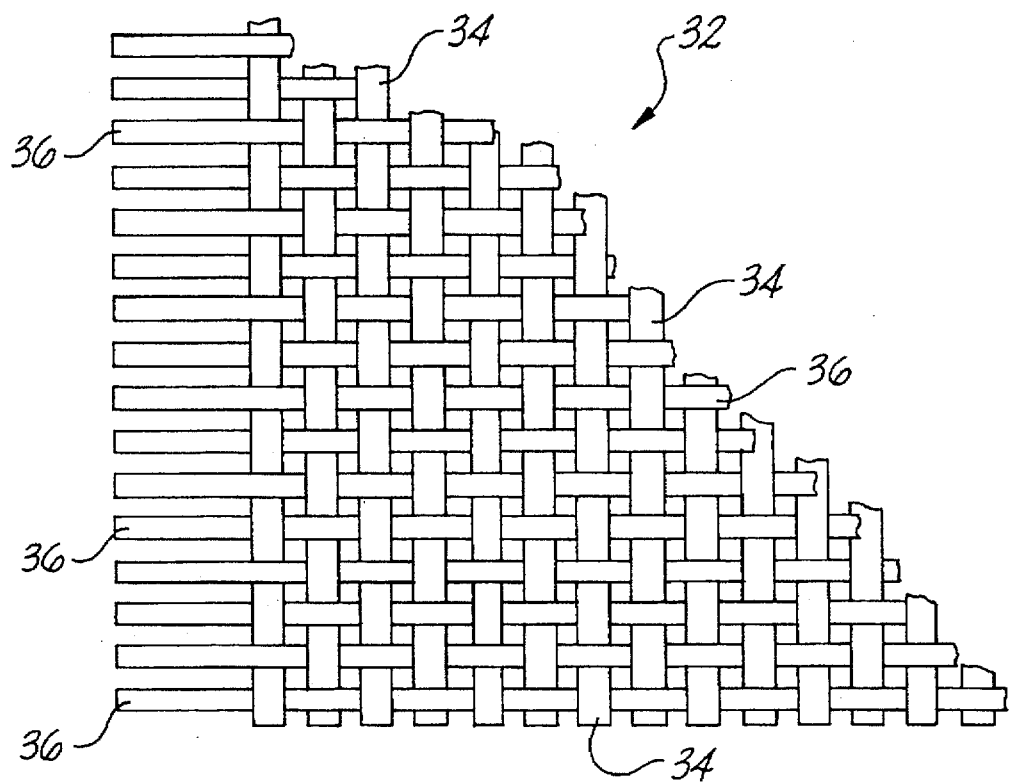
Fig. 2
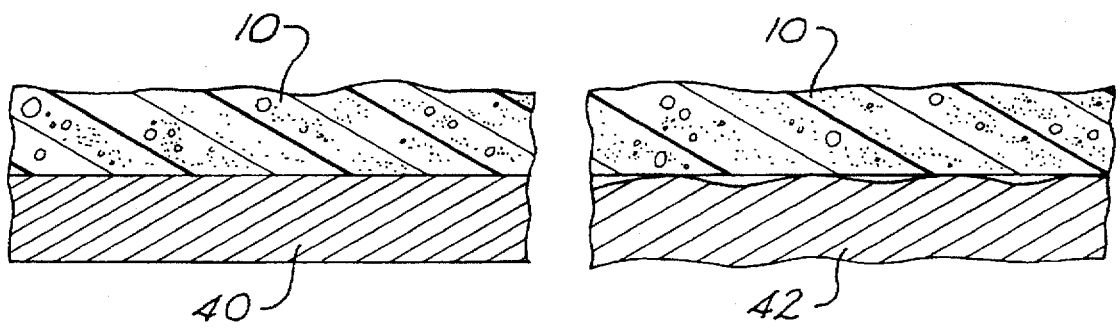
PRIOR ART
Fig. 3A
Fig. 3B

RELEASE LINER AND METHOD OF USING SAME

FIELD OF THE INVENTION

The present invention generally relates to a release liner adapted to separate adjacent layers of an elastomeric material, and more particularly to a release liner made, at least in part, from a fibrillated yarn.

BACKGROUND OF THE INVENTION

Various products made from elastomeric compounds such as rubber, are typically manufactured utilizing sheets of the elastomeric compound. For instance, when making vehicle tires and other similar objects, sheets of a "green", uncured and unvulcanized rubber compound are cut to a desired dimension and wrapped around a shaped article, such as a preformed core. The shaped article covered with the sheet-like material is then placed in a heated mold under pressure and cured to form the desired product.

The sheet-like material, or "feed stock," used to make the rubber objects is typically stored in multiple layers. For instance, a long sheet of the material may be stored as a spirally wound roll. In an uncured state, however, the elastomeric material is very tacky and may not only stick to itself, but also attracts contaminants such as dirt, lint and grit.

Conventionally, a separator sheet has been placed between adjacent layers of the elastomeric feed stock to prevent it from becoming dirty, as well as to separate the individual layers and facilitate later use of the material. The separator sheets have typically been made from textile fabric or films that preferably can be easily separated from the tacky elastomeric material. Some separator sheets have been designed to be disposable after one use while other separator sheets have been designed to be reusable.

One example of a separator sheet is disclosed in U.S. Pat. No. 4,017,654 to Evans et al. Evans et al. discloses a protective film overlay that is adapted to loosely adhere to a tacky unvulcanized rubber stock. The protective film overlay has a thickness in the range from about 0.05 mils to about 10 mils and is comprised of unvulcanized thermoelastic block copolymers. The film overlay made from the unvulcanized composite is compatible with the rubber stock in case bits and pieces of the overlay tear off and remain adhered to the rubber stock when the overlay is removed.

As stated above, besides films, fabrics have also been used in the past as separator sheets. For instance, the assignee of the present invention has previously sold woven fabrics adapted for separating adjacent layers of elastomeric materials. One particular woven fabric sold in the past was made exclusively from a polypropylene multifilament yarn. In particular, the yarn was made from a bundle of filaments that were produced by extruding polypropylene through a spinnerette.

The assignee of the present invention also previously sold a woven fabric for use in separating adjacent layers of an elastomeric material made from a combination of a multifilament yarn with a monofilament yarn.

The woven fabrics used in the past as separator sheets have proven to be useful in the art of manufacturing rubber products. The present invention is directed to further improvements in separator sheets adapted to be placed between adjacent layers of elastomeric materials. Release liners of the present invention generally tend to separate more easily from an elastomeric material onto which it has been placed than fabrics that have been used in the past. Since the release liner of the present invention easily separates from elastomeric materials, it is believed that the release liner will experience less wear and will be able to be used repeatedly before having to be discarded.

SUMMARY OF THE INVENTION

The present invention is directed to further improvements in release liners adapted to be placed between adjacent layers of an uncured elastomeric material. Accordingly, it is an object of the present invention to provide an improved release liner made from textile fabric.

It is another object of the present invention to provide a release liner that is made, at least in part, from a fibrillated yarn.

Another object of the present invention is to provide a release liner comprising a woven fabric made from a fibrillated yarn in combination with a monofilament yarn.

Still another object of the present invention is to provide a release liner that loosely contacts an elastomeric material and thus can be easily separated from the material.

It is another object of the present invention to provide a release liner made from a textile fabric that can be used repeatedly.

These and other objects of the present invention are achieved by providing a release liner comprising a fabric adapted to be placed between adjacent layers of an elastomeric material for preventing the layers of elastomeric material from sticking together. In exemplary embodiments, the fabric is made at least in part from a fibrillated yarn that may be made from a network of interconnected and discontinuous fibrillated filaments. The fibrillated yarn can have a denier from about 500 to about 700.

In one embodiment, the fibrillated yarn can be the warp yarn and can be made from polypropylene. The fill yarn contained in the fabric can be a monofilament yarn for providing stiffness and more body to the resulting fabric. The monofilament yarn can be made from a polyolefin, such as polypropylene, and can have a denier from about 300 to about 500. Also, exemplary constructions of the fabric can have from about 35–40 warp yarns per inch and about 30–40 fill yarns per inch.

These and other objects of the present invention are also achieved by providing a layered elastomeric article. The elastomeric article can include layers of an elastomeric material and a release liner placed between the adjacent layers. The release liner prevents the layers of the elastomeric material from sticking together and can comprise a fabric made, at least in part, from a fibrillated yarn. The fibrillated yarn can be made from a polyolefin and may have a denier from about 500 to about 700. In one embodiment, the fibrillated yarn may be made from a network of interconnected fibrillated filaments.

In one embodiment, the release liner is made from a woven fabric having a warp yarn and a fill yarn. The warp yarn may comprise the fibrillated yarn, while the fill yarn may comprise a monofilament yarn. The monofilament yarn can have a denier from about 200 to about 1000 and can be made from a polyolefin, a nylon or a polyester.

These and other objects of the present invention are also achieved by providing a method of separating multiple layers of an elastomeric material. The method includes the step of placing a release liner between adjacent layers of the elastomeric material. The release liner can comprise a fabric made, at least in part, from a fibrillated yarn. In one embodiment, the release liner can include a fabric made from a fibrillated yarn in combination with a monofilament yarn.

Other objects, features and aspects of the present invention are discussed in greater detail below.

BRIEF DESCRIPTION OF THE DRAWINGS

A full and enabling disclosure of the present invention, including the best mode thereof, to one of ordinary skill in the art, is set forth more particularly in the remainder of the specification, including reference to the accompanying figures, in which:

FIG. 2 is an enlarged plan view illustrating a portion of a release liner made in accordance with the present invention;

FIG. 3A is an enlarged cross-sectional view illustrating a prior art release liner in association with the elastomeric material;

FIG. 3B is an enlarged cross-sectional view illustrating a release liner made in accordance with the present invention in association with the elastomeric material;

Figure 1:
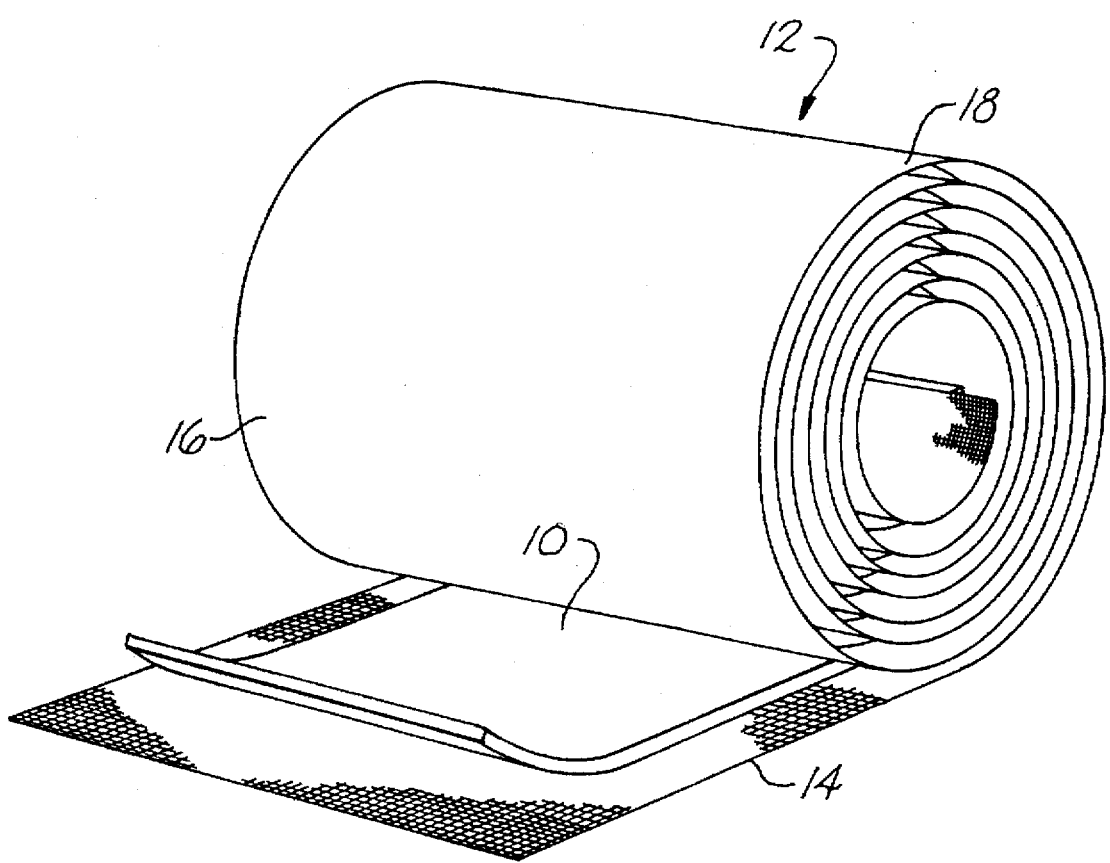
FIG. 1 is perspective view of a spirally wound roll of a sheet of elastomeric material having a release liner made according to the present invention separating adjacent layers.

Repeat use of reference characters in the present specification and drawings is intended to represent same or analogous features or elements of the invention.

DETAILED DESCRIPTION OF THE PREFERRED EMBODIMENT

It is to be understood by one of ordinary skill in the art that the present discussion is a description of exemplary embodiments only, and is not intended as limiting the broader aspects of the present invention, which broader aspects are embodied in the exemplary constructions.

The present invention is generally directed to a release liner adapted for separating adjacent layers of an elastomeric material. The elastomeric material can be, for instance, a feed stock used in the manufacture of rubber articles, such as vehicle tires. The release liner of the present invention prevents adjacent layers of the elastomeric material from sticking together, while remaining easily separable from the surface of the elastomeric material. The release liner is also durable and can be reused repeatedly.

As illustrated in FIG. 1, a sheet 10 of uncured, unvulcanized elastomeric material is typically spirally wound into a roll generally 12 for transportation and storage prior to use. The elastomeric material can be, for instance, a neoprene rubber, a natural rubber, a polyurethane, or other elastomeric materials and mixtures thereof. Besides being stored in a spirally wound roll as shown in FIG. 1, these types of materials can also be cut into sheets and stacked together.

Sheet 10 is laid on top of a release liner 14 prior to being wound into roll 12. As described above, release liner 14 prevents adjacent layers of the elastomeric material from sticking together and otherwise generally protects the elastomeric material. As shown, release liner 14 is made from a fabric typically having a width greater than the width of sheet 10, creating lateral sides 16 and 18. Lateral sides 16 and 18 are provided not only to protect roll 12 of elastomeric material 10 but also are used when release liner 14 is separated from the surface of the elastomeric material.

Release liner 14 as shown in FIG. 1 can be made, for instance, from a woven fabric, a knitted fabric, or a weft inserted fabric. In accordance with the present invention, the fabric is made, at least in part, from a fibrillated yarn. As used herein, a fibrillated yarn refers to a yarn made from flat, tape-like filaments. One application in which fibrillated yarns have been used in the past is in the production of filter cloths.

Figure 4:
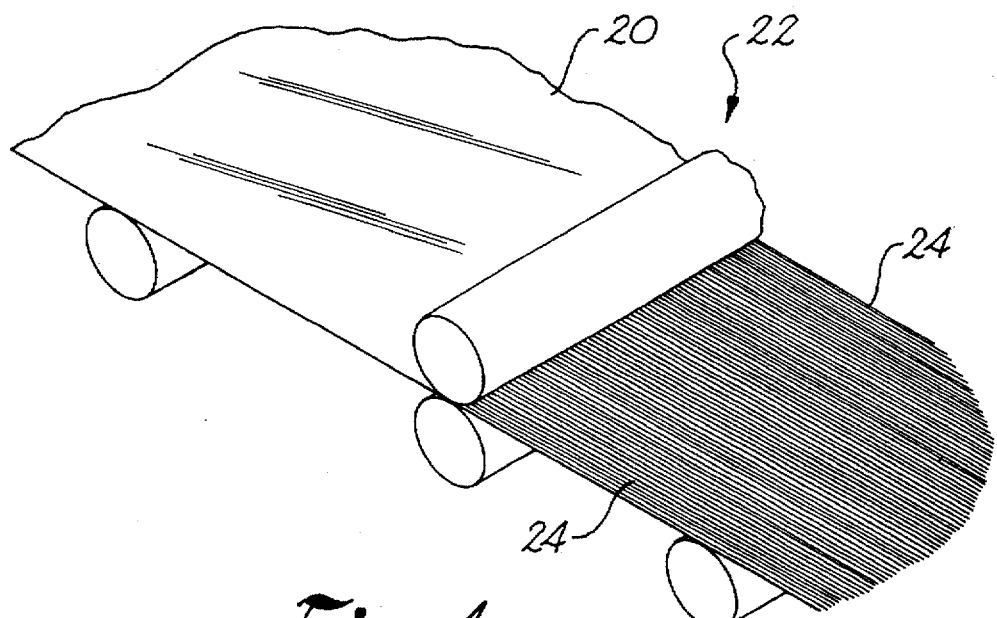
FIG. 4 is a perspective view with cutaway portions of a polymer film being made into fibrillated filaments.

Referring to FIG. 4, one exemplary embodiment of a process that may be used in making fibrillated yarns is shown. In this embodiment, an extruded sheet of polymer film 20 is fed through a slitting device generally indicated at 22. Slitting device 22 slices polymer film 20 into a multitude of narrow strands of film or slit yarns 24. It should be appreciated, however, that narrow strands 24 can be made in a variety of other different ways.

Figure 5:
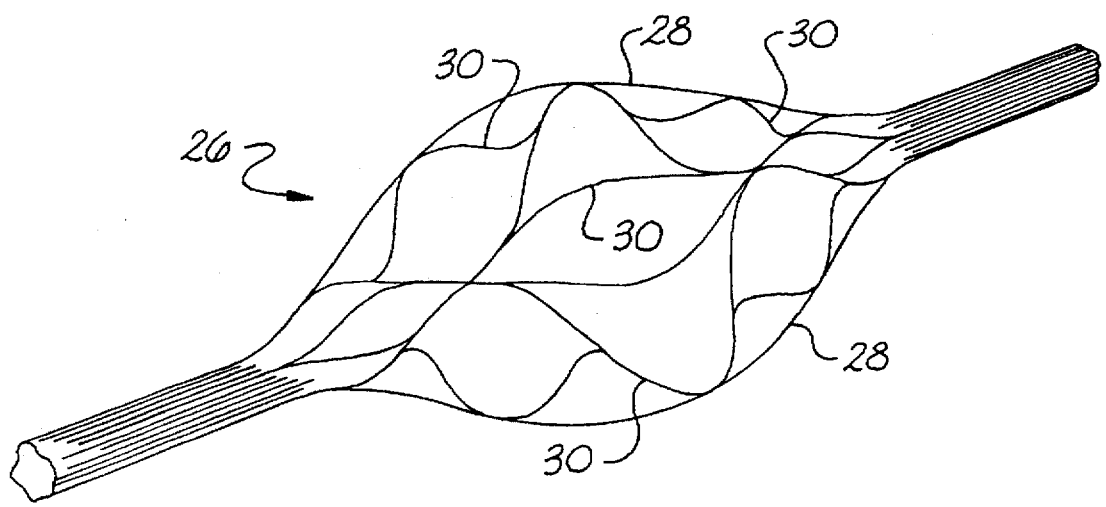
FIG. 5 is a perspective view of a portion of a preferred fibrillated yarn for use in making the release liner of the present invention.

Once formed, narrow strands 24 can be used to construct a fibrillated yarn generally 26 as shown in FIG. 5. Fibrillated yarn 26 illustrates one exemplary and preferred embodiment of a fibrillated yarn that may be used in fabricating the release liner of the present invention. As shown, a midsection of yarn 26 has been pulled apart in order to show the manner in which the yarn is constructed. Fibrillated yarn 26 includes an outside layer of continuous fibrillated filaments 28. Between filaments 28, yarn 26 includes a network of interconnected fibrillated filaments 30. Specifically, fibrillated filaments 30 can be discontinuous and can be welded together at points of intersection. Fibrillated filaments 30 form a net-like matrix that not only gives strength to yarn 26 but also provides surface characteristics that are desirable for use in a release liner.

Typically, fibrillated yarn 26 is made exclusively from narrow strands or slit yarns 24 such as shown in FIG. 4. Narrow strands 24 are fed into a process which forms the network of filaments as shown in FIG. 5. Once the network of interconnected fibrillated filaments is formed, the resulting yarn can be twisted, if desired, to further consolidate the structure.

Once formed, fibrillated yarn 26 can be incorporated into a release liner made in accordance with the present invention. In the past, a release liner had been made using a multifilament yarn as opposed to a fibrillated yarn. As used herein, a multifilament yarn refers to a yarn made from a bundle of continuous filaments produced by extrusion through a spinnerette. Various improvements and advantages have been observed when using a fibrillated yarn as opposed to a multifilament yarn to produce a release liner as will be described in more detail hereinafter.

Fibrillated yarns used to make the release liner of the present invention can be made from a variety of different polymeric materials. In preferred embodiments, the fibrillated yarn can be made from a polyolefin, such as polyethylene or polypropylene.

Referring to FIG. 2, one embodiment of a release liner made in accordance with the present invention is illustrated. In this embodiment, the release liner is made from a woven fabric, generally indicated at 32. According to the present invention, woven fabric 32 can be made exclusively from fibrillated yarns or, alternatively, from fibrillated yarns in combination with other types of yarns.

In the illustrated embodiment, woven fabric 32 includes warp yarns 34 extending in the vertical direction and fill yarns 36 extending in the horizontal direction. In one preferred embodiment of the present invention, warp yarns 34 are comprised of a fibrillated yarn, while fill yarns 36 are made from a different, stiffer yarn. For example, fill yarns 36 can comprise a monofilament yarn, which is a yarn consisting of one continuous filament or strand.

The stiffer, monofilament yarn adds body to woven fabric 32, making the fabric crease resistant and drape resistant. As shown in FIG. 1, lateral sides 16 and 18 of release liner 14 overlap sheet 10 of the elastomeric material. By adding a stiff yarn, such as a monofilament yarn, to the release liner, lateral sides 16 and 18 do not bend and become limp. In addition, the stiff yarn will produce a release liner which is less prone to become snagged, is less prone to unravel, and affords more protection to the elastomeric material. Further, by including a stiff yarn in combination with a fibrillated yarn, the resulting release liner will be easier to apply and remove from the elastomeric material and may be more durable.

Exemplary monofilament yarns that may be used in the release liner of the present invention include monofilament yarns made from synthetic materials, such as polyolefins, namely polypropylene and polyethylene. Other suitable monofilament yarns can be made from polyesters and from nylons.

The monofilament yarn may have a denier generally from about 200 to about 1000 and more particularly between from about 300 to about 500. The fibrillated yarn used in woven fabric 32, on the other hand, generally can have a denier between from about 500 to about 700, and more particularly from about 540 to about 660. In the past, fibrillated yarns having a denier of about 600 have been found to be well suited for use in the present invention. As used herein, denier refers to the weight of the yarn per unit length in grams per 9000 meters.

When an elastomeric material is placed on woven fabric 32, such as shown in FIG. 2, the fabric should have a weave that prevents the elastomeric material from seeping through the fabric in a phenomenon known as "grin through." If grin through were to occur, not only would the layers of elastomeric material stick together, but it would also make it much more difficult to separate the release liner from the surface of the material. Consequently, woven fabric 32 should be made with a relatively tight weave. For instance, in one embodiment, when warp yarn 34 is made from a fibrillated yarn having a denier of approximately 600, fabric 32 can have from about 35 to about 45 warp ends per inch. When fabric 32 also incorporates a monofilament yarn having a denier of about 400 as fill yarn 36, fabric 32 may have from about 30 picks to about 40 picks per inch.

As stated above, many advantages and improvements are obtained and achieved when a release liner is made, at least in part, from a fibrillated yarn. In general, the fibrillated yarn causes the resulting fabric to have a coarser and more textured surface than a fabric made using multifilament yarns of the same material. When using a fibrillated yarn, the release liner is believed to have fewer points of contact with the elastomeric material. As a result, a release liner made in part from fibrillated yarn tends to separate more easily from the surface of the elastomeric material and, therefor, is believed to experience less wear. If the fabric does not wear as quickly, then the fabric may last longer than conventional release liners.

In order to illustrate the above described advantages of the present invention, FIGS. 3A and 3B are provided to show a comparison between a prior art release liner 40 (FIG. 3A) and a release liner 42 (FIG. 3B) made in accordance with the present invention. Referring to FIG. 3A, prior art release liner 40 is shown in contact with a sheet 10 of elastomeric material. Release liner 40 made, for instance, from multifilament yarns is generally in close and direct contact with the elastomeric material.

Referring to FIG. 3B, release liner 42, on the other hand, made with a fibrillated yarn in accordance with the present invention, is shown to have less area of contact with sheet 10 of the elastomeric material than release liner 40. By having fewer points of contact with sheet 10, release liner 42 separates more easily from the surface of the elastomeric material. Because there are less points of contact, it is believed release liner 42 will wear less and can be reused more times than conventional fabrics.

The present invention may be better understood with reference to the following example.

EXAMPLE 1

A release liner adapted to separate adjacent layers of an elastomeric material made in accordance with the present invention was constructed as follows. The fibrillated yarn used in the release liner, which was constructed from an interconnected network of fibrillated filaments as exemplified by FIG. 5, was obtained from Synthetic Industries of Chattanooga, Tenn.

A woven fabric to be used as a release liner was made using a 600 denier fibrillated yarn as the warp yarn and a 410 denier monofilament yarn as the fill yarn. Both yarns were made from polypropylene. The fibrillated yarn was twisted three times per inch in the Z direction. After being woven, scoured and heat set, the fabric had a width of approximately 63 inches. The fabric had 39 ends per inch and 34 picks per inch. The fabric weighed approximately 62 pounds per 100 yards.

The above described fabric was tested as a release liner and found to easily separate from an elastomeric material once applied between adjacent layers.

These and other modifications and variations to the present invention may be practiced by those of ordinary skill in the art, without departing from the spirit and scope of the present invention, which is more particularly set forth in the appended claims. In addition, it should be understood that aspects of the various embodiments may be interchanged both in whole or in part. Furthermore, those of ordinary skill in the art will appreciate that the foregoing description is by way of example only, and is not intended to limit the invention so further described in such appended claims.

What is claimed:

1. A layered elastomeric article comprising:
   a plurality of layers of a sheet-like elastomeric material; and
   a release liner placed between adjacent layers of said elastomeric material for preventing said layers of said elastomeric material from sticking together, said release liner comprising a fabric made from at least one type of yarn, said at least one type of yarn comprising a fibrillated yarn.

2. A layered elastomeric article as defined in claim 1, wherein said fibrillated yarn has a denier between from about 500 to about 700.

3. A layered elastomeric article as defined in claim 1, wherein said fibrillated yarn is generally made from a network of interconnected fibrillated filaments.

4. A layered elastomeric article as defined in claim 1, wherein said fibrillated yarn is made from a polyolefin.

5. A layered elastomeric article as defined in claim 1, wherein said release liner comprises a woven fabric having a warp yarn and a fill yarn, said warp yarn comprising said fibrillated yarn, said fill yarn comprising a monofilament yarn.

6. A layered elastomeric article as defined in claim 5, wherein said monofilament yarn has a denier between from about 200 to about 1000.

7. A layered elastomeric article as defined in claim 5, wherein said monofilament yarn is made from a material selected from the group consisting of a polyolefin, a polyester, and a nylon.

8. A layered elastomeric article as defined in claim 5, wherein said woven fabric has from about 35 warp yarns per inch to about 45 warp yarns per inch and from about 30 fill yarns per inch to about 40 fill yarns per inch.

9. A layered elastomeric article as defined in claim 1, wherein said layers of said elastomeric material comprise a sheet of said elastomeric material spirally wound into a roll.

10. A release liner comprising:
a woven fabric adapted to be placed between adjacent layers of an elastomeric material for preventing said layers of elastomeric material from sticking together, said woven fabric including a warp yarn and a fill yarn, said warp yarn comprising a fibrillated yarn having a denier from about 500 to about 700.

11. A release liner as defined in claim 10, wherein said fill yarn comprises a monofilament yarn.

12. A release liner as defined in claim 11, wherein said fibrillated yarn is made from a polypropylene and has a denier from about 540 to about 660, said monofilament yarn having a denier from about 300 to about 500.

13. A release liner as defined in claim 11, wherein said woven fabric has from about 35 warp yarns per inch to about 45 warp yarns per inch and from about 30 fill yarns per inch to about 40 fill yarns per inch.

14. A release liner as defined in claim 10, wherein said fibrillated yarn is made generally from a network of interconnected and discontinuous fibrillated filaments.

15. A release liner as defined in claim 14, wherein said fibrillated yarn is made from a polyolefin.

16. A release liner comprising:
a woven fabric adapted to be placed between adjacent layers of an elastomeric material for preventing said layers of elastomeric material from sticking together, said woven fabric including a warp yarn and a fill yarn, said warp yarn comprising a fibrillated yarn made from a network of interconnected and discontinuous fibrillated filaments, said fibrillated yarn having a denier from about 500 to about 700, said fill yarn comprising a monofilament yarn having a denier from about 300 to about 500, said woven fabric having from about 35 warp yarns per inch to about 45 warp yarns per inch and from about 30 fill yarns per inch to about 40 fill yarns per inch.

17. A method of separating multiple layers of an elastomeric material, said method comprising the step of:
providing a plurality of layers of sheet-like elastomeric material; and
placing a release liner between adjacent layers of said elastomeric material, said release liner comprising a fabric made from at least one type of yarn, said at least one type of yarn comprising a fibrillated yarn.

18. A method as defined in claim 17, wherein said fibrillated yarn comprises a network of interconnected fibrillated filaments.

19. A method as defined in claim 18, wherein said release liner comprises a woven fabric having a warp yarn and a fill yarn, said warp yarn comprising said fibrillated yarn.

20. A method as defined in claim 19, wherein said fill yarn comprises a monofilament yarn.

21. A method as defined in claim 19, wherein said woven fabric has from about 35 warp yarns per inch to about 45 warp yarns per inch and has from about 30 fill yarns per inch to about 40 fill yarns per inch.

22. A method as defined in claim 17, wherein said fibrillated yarn has a denier from about 540 to about 660.

23. A method as defined in claim 17, wherein said fibrillated yarn is made from polypropylene.

* * * * *